United States Patent
Ikebe et al.

[11] Patent Number: 6,125,011
[45] Date of Patent: Sep. 26, 2000

[54] DISC CARTRIDGE WITH PARTICULAR COVER CONFIGURATION

[75] Inventors: Masaru Ikebe; Masatoshi Okamura, both of Nagano; Katsumi Suzuki, Tokyo; Takashi Koshiyouji, Kanagawa, all of Japan

[73] Assignees: TDK Corporation; Kabushiki Kaisha Toshiba, both of Japan

[21] Appl. No.: 08/972,026

[22] Filed: Nov. 17, 1997

[30] Foreign Application Priority Data

Nov. 18, 1996 [JP] Japan ................................. 8-322295
Nov. 18, 1996 [JP] Japan ................................. 8-322296
Nov. 18, 1996 [JP] Japan ................................. 8-322297

[51] Int. Cl.[7] .................................................. G11B 23/03
[52] U.S. Cl. ........................................ 360/133; 369/291
[58] Field of Search ......................... 360/133; 369/291; 206/308.1, 308.3

[56] References Cited

U.S. PATENT DOCUMENTS

| | | | |
|---|---|---|---|
| 4,460,930 | 7/1984 | Takahashi | 360/60 |
| 5,048,008 | 9/1991 | Haruna | 369/291 |
| 5,093,823 | 3/1992 | Ouwerkerk et al. | 360/133 |
| 5,150,354 | 9/1992 | Iwata et al. | 360/133 |
| 5,263,580 | 11/1993 | Ciba et al. | 206/308.1 |
| 5,293,293 | 3/1994 | Iwata et al. | 360/133 |
| 5,515,979 | 5/1996 | Salvail | 211/40 |
| 5,715,233 | 2/1998 | Yoshida et al. | 360/133 |
| 5,746,314 | 5/1998 | Knutsen et al. | 206/308.1 |
| 5,757,764 | 5/1998 | Tanaka | 369/291 |
| 5,825,747 | 10/1998 | Tanaka | 369/291 |
| 5,842,563 | 12/1998 | Herr et al. | 206/308.1 |

FOREIGN PATENT DOCUMENTS

| | | |
|---|---|---|
| 0 332 214 | 9/1989 | European Pat. Off. . |
| 0 335 461 | 10/1989 | European Pat. Off. . |
| 0 368 347 | 5/1990 | European Pat. Off. . |
| 0 744 743 | 11/1996 | European Pat. Off. . |
| 0 768 664 | 4/1997 | European Pat. Off. . |
| 0 768 665 | 4/1997 | European Pat. Off. . |
| 0 772 196 | 5/1997 | European Pat. Off. . |
| 0 795 866 | 9/1997 | European Pat. Off. . |
| 58-75383 | 5/1983 | Japan . |
| 63-87677 | 4/1988 | Japan . |
| 2-301084 | 12/1990 | Japan . |
| 3-48780 | 10/1991 | Japan . |
| 6-139741 | 5/1994 | Japan . |
| 95/26027 | 9/1995 | WIPO . |
| 97/11463 | 3/1997 | WIPO . |

*Primary Examiner*—Brian E. Miller
*Attorney, Agent, or Firm*—Lerner, David, Littenberg, Krumholz & Mentlik, LLP

[57] ABSTRACT

A disc cartridge of the open cover type capable of readily accomplishing takeout and insertion of a disc medium with respect to the cartridge while ensuring easiness of assembling thereof and increased reliability in operation thereof. An upper casing member is formed on a side surface thereof opposite from a shutter with a takeout opening which permits a disc medium to be taken out of a casing therethrough. The casing is mounted thereon with a cover for opening and closing the takeout opening. The cover is provided with support shafts disposed on opposite sides thereof. The upper casing member is provided with guide grooves in which the respective support shafts are slidably and pivotally fitted, to thereby permit the cover to be selectively opened. The cover may be provided with a receiving section for slidably receiving an erasure prevention member therein. The disc cartridge may be provided with a discrimination member for detecting whether takeout of the disc medium has been carried out.

18 Claims, 8 Drawing Sheets

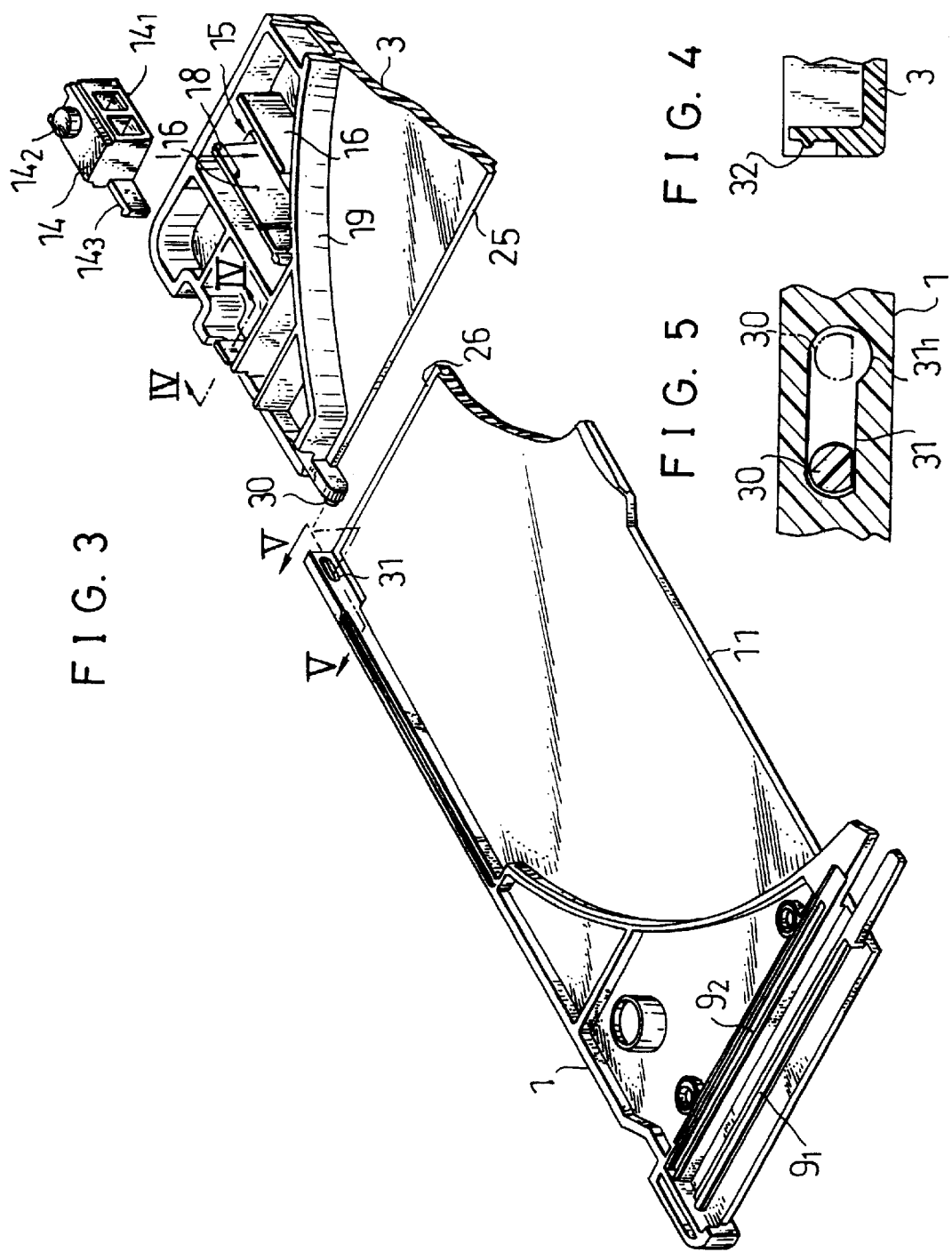

DISC CARTRIDGE WITH PARTICULAR COVER CONFIGURATION

BACKGROUND OF THE INVENTION

This invention relates to a disc cartridge, and more particularly to a disc cartridge having a disc medium such as a recordable/reproducible optical disc, a magneto-optical disc or the like rotatably received in a casing.

In general, information media including, for example, a disc medium such as a magnetic disc, an optical disc, a magneto-optical disc or the like are each used in the form of a disc cartridge while being received in a casing formed by joining upper and lower casing members to each other. The disc cartridge includes a shutter for selectively opening or closing holes such as head insertion holes, drive shaft insertion holes and the like formed through the upper and lower casing members of the casing. Generally, such a conventional disc cartridge is not provided with any means for taking out the disc medium from the casing for replacement. However, a disc cartridge called a CD caddie which is used for a CD-ROM or the like is constructed so as to permit a CD to be taken out of a casing. Such a CD caddie is adapted to be used in a CD-ROM reproducing unit of the type of using the CD caddie. Thus, the disc medium is used either in the form as taken out from the disc cartridge or in the form as received in the disc cartridge depending on the type of a recording/reproducing unit, thus, it is needed to take out the disc medium from the disc cartridge as required.

However, the conventional disc cartridge including the disc medium takeout mechanism is not constructed so as to permit a shutter mechanism to be arranged on a side of the disc cartridge on which the disc medium takeout cover is pivotally arranged. Also, upper and lower casing members of the casing of the disc cartridge are rendered highly different in configuration from each other. Thus, the disc medium takeout mechanism fails to be applied to a disc cartridge of the vertically reversible type or both-sided type. Another disc medium takeout mechanism has been also proposed which is constructed so as to open only a side surface of the casing opposite from the shutter to take out the disc medium from the disc cartridge. The proposed disc medium takeout mechanism causes the disc medium takeout cover to be operated either detachably or pivotally. Detachable operation of the cover leads to separation or removal of the cover from the casing, resulting in the cover being possibly lost. Pivotal operation of the cover causes the cover to be engaged with the casing through only a pivot shaft, so that the cover, casing or pivot shaft may be broken due to application of a shock or external force to the disc cartridge. Also, it fails to fully close the cover due to inclination thereof, leading to a deterioration in reliability.

In addition, the conventional disc cartridge equipped with the disc medium takeout mechanism is provided with a disc medium takeout cover, which is arranged on the casing of the disc cartridge so as to be pivotally moved for taking out the disc medium from the disc cartridge, so that erasure prevention is carried out only by a lug provided on an opposite side of the casing remote from the cover. Thus, once the lug is removed from the casing, it is required to apply an adhesive tape or the like to a portion of the casing from which the lug was removed, in order to carry out recording on the disc medium again. Unfortunately, this renders handling of the disc cartridge troublesome and causes an adhesive of the adhesive tape and/or the adhesive tape per se to be left on the recording/reproducing unit, to thereby possibly cause a failure or malfunction of the unit.

Whereas, in the conventional disc cartridge which is constructed so as not to permit replacement of the disc medium, an erasure prevention member is arranged so as to be movable between a recordable position and a unrecordable position in the casing, as widely known in the art. Application of such arrangement of the erasure prevention member to the cover-equipped disc cartridge renders takeout of the disc impossible or causes the erasure prevention member to be removed or detached from the casing when the cover is open, because such a disc cartridge is generally constructed so that the erasure prevention member is arranged at a disc takeout section.

Also, the conventional disc cartridge equipped with the disc medium takeout mechanism lacks a detection mechanism for detecting whether the disc medium takeout cover has been opened in order to take out the disc medium from the disc cartridge in the past. When the disc medium is used as taken out from the disc cartridge, there is possibility that a fingerprint, dust or the like is adhered to a surface of the disc medium or the surface thereof is damaged, leading to an error such as wrong recording, a failure in recording or the like during recording operation, resulting in reading-out of data from the disc medium being failed. In order to avoid such a problem, it would be considered to verify a recording section of the disc medium to inspect the disc medium, to thereby check any possible error on the disc medium before the recording operation. However, application of such a system to recording onto the disc medium which has not been taken out from the disc cartridge causes a length of time required for the recording to be double or more, resulting in being impractical.

In view of the problem, a system has been proposed wherein a discrimination section for detecting whether takeout of the disc medium has been carried out in the past is arranged which is constructed so as to vary from an initial state and be never permitted to return to the initial state when the disc medium takeout cover has been opened even once. Thus, the system, so long as the cover has never been open, permits the recording to be accomplished with an increased speed because it is not carried out to verify the disc medium. Also, after the cover has been open, the disc medium is subjected to verification although the verification requires time for the recording, resulting in the recording being substantially free from any error.

Nevertheless, the conventional disc cartridge requires a troublesome procedure that a user operates the discrimination section and then open the disc medium takeout cover. Also, it causes debris produced from the discrimination section of the disc cartridge to enter the casing of the disc cartridge, leading to damage to the disc medium. Further, the debris possibly intrudes into the recording/reproducing unit, leading to a failure or malfunction of the unit, resulting in deteriorating both operability and reliability of the unit.

SUMMARY OF THE INVENTION

The present invention has been made in view of the foregoing disadvantages of the prior art.

Accordingly, it is an object of the present invention to provide a disc cartridge which is capable of readily accomplishing takeout and insertion of a disc medium with respect to the disc cartridge while ensuring easiness of assembling thereof and increased reliability in operation thereof.

It is another object of the present invention to provide a disc cartridge of the double-sided operation type in which both upper and lower sides thereof are formed with substantially the same configuration, resulting in ensuring double-sided operation thereof while facilitating takeout and insertion of a disc medium with respect to the disc cartridge.

It is still another object of the present invention to provide a disc cartridge which is capable of repeatedly selecting erasure prevention or recordability on a disc medium irrespective of arrangement of a disc medium takeout cover on the disc cartridge.

It is even another object of the present invention to provide a disc cartridge which is capable of preventing an erasure prevention member from being removed or detached from disc cartridge due to operation of a disc medium takeout cover.

It is yet another object of the present invention to provide a disc cartridge which is capable of detecting whether takeout of a disc medium has been carried out in the past, to thereby exhibit increased reliability in operation thereof, facilitate handling thereof and eliminating any malfunction thereof while keeping the disc medium or a recording/reproducing unit from being damaged.

In accordance with the present invention, a disc cartridge is provided. The disc cartridge generally includes a casing including an upper casing member and a lower casing member joined to each other and formed with openings through which a recording/reproducing head and a drive shaft are inserted into the casing, a disc medium rotatably received in the casing, and a shutter arranged on the casing for opening and closing the openings. The casing is formed on a side surface thereof opposite from the shutter with a takeout opening which permits the disc medium to be taken out of the casing therethrough. The disc cartridge further includes a cover slidably and pivotally arranged on the casing to open and close the takeout opening, a guide means arranged on one of the upper and lower casing members for slidably and pivotally moving the cover, and an engagement member provided on the cover and engaged with the guide means, to thereby be guided by the guide means.

In a preferred embodiment of the present invention, the cover is slidably and pivotally arranged on one of the upper and lower casing members and has support shafts provided on opposite sides thereof. One of the upper and lower casing members is provided with guide grooves in which the support shafts of the cover are slidably and pivotally fitted, respectively, to thereby permit the cover to be selectively opened while being separated from the other of the upper and lower casing members.

In a preferred embodiment of the present invention, the support shafts of the cover are each formed with a partially cut-out cylindrical shape, to thereby have a flat surface partially formed on a periphery thereof, and are each fitted in a respective one of the guide grooves so as to slide while the flat surface of the support shaft is guided along a side surface of the guide groove. The guide grooves are each formed at one end thereof with a circular hole, and the support shafts are each pivotally moved in the circular hole of a respective one of the guide grooves, resulting in the cover being selectively opened as desired.

In a preferred embodiment of the present invention, the cover is provided with a receiving section for receiving an erasure prevention member and the erasure prevention member is slidably held in the receiving section of the cover.

In a preferred embodiment of the present invention, the receiving section of the cover is defined by guide walls arranged on the cover in a manner to be opposite to each other. The guide walls may be respectively provided on a lower portion thereof with hooklike projections in a manner to be opposite to each other and partially cover a lower surface of the erasure prevention member, resulting in preventing the erasure prevention member from being removed from the cover.

In a preferred embodiment of the present invention, the erasure prevention member is provided on upper and bottom surfaces thereof with an operation element and a discrimination indication portion in a manner to be projected therefrom, respectively. The cover may be provided at a portion of a top wall thereof defined between the guide walls with an operation hole corresponding to the operation element.

In a preferred embodiment of the present invention, the disc cartridge further includes a discrimination member, removably provided on the casing, for indicating that takeout of the disc medium has not been carried out and a release projection provided on the cover so as to be abutted against the discrimination member.

In a preferred embodiment of the present invention, the discrimination member is formed in a manner to be integral with the lower casing member while being partially separated from the lower casing member through a ring-like slit formed between the discrimination member and the lower casing member and connected to the lower casing member through a thin-wall connection arranged therebetween. The discrimination member is provided thereon with a projection, wherein the projection of the discrimination member is arranged in proximity to the connection so as to be abutted against the release projection, resulting in the discrimination member being removed from the lower casing member and discharged outwardly of the casing due to abutment of the release projection against the projection of the discrimination member caused during the sliding movement of the cover.

In a preferred embodiment of the present invention, the release projection is shaped in the form of an arcuate rib and connected to an outer surface of one of the guide walls formed on the cover for defining the receiving section for receiving the erasure prevention member therein.

In a preferred embodiment of the present invention, the upper and lower casing members are formed with substantially the same outer configuration and the other casing member opposite to the one casing member on which the cover is arranged is formed at a portion of an inner surface thereof opposite to the cover with a flat shape.

In a preferred embodiment of the present invention, the cover and the one casing member are formed at respective edge portions thereof abutted against each other with stepped fit surfaces.

In a preferred embodiment of the present invention, the shutter includes a slider structure for slidably guiding the shutter and an elastic member for urging the shutter in a direction of closing the openings.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference characters designate like or corresponding parts throughout; wherein:

FIG. 3 is a fragmentary exploded perspective view showing an inside of an upper casing member;

FIG. 4 is an enlarged vertical sectional view taken along line IV—IV of FIG. 3;

FIG. 5 is an enlarged vertical sectional view taken along line V—V of FIG. 3;

DETAILED DESCRIPTION OF THE PREFERRED EMBODIMENTS

Figure 1:
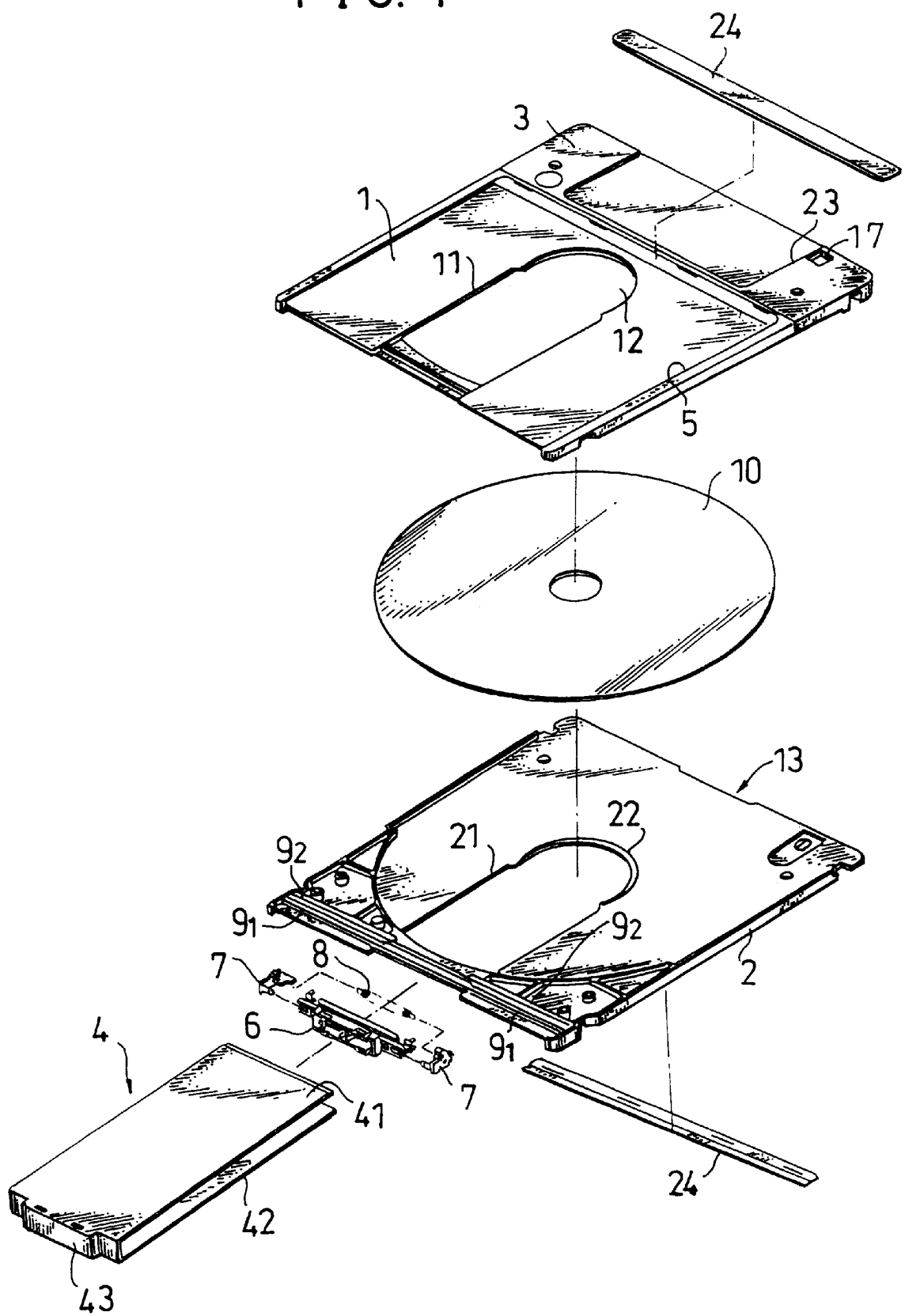
FIG. 1 is an exploded perspective view showing an embodiment of a disc cartridge according to the present invention.

Now, a disc cartridge according to the present invention will be described hereinafter with reference to the accompanying drawings.

Referring first to FIGS. 1 to 9B, an embodiment of a disc cartridge according to the present invention is illustrated. A disc cartridge of the illustrated embodiment is adapted to receive an optical disc medium therein. The disc cartridge includes a casing formed by joining an upper casing member 1 and a lower casing member 2 to each other. The disc cartridge also includes a disc medium 10 rotatably received in the casing so as to act as an information medium. The disc medium 10 may be either a both-sided recordable/reproducible disc or a one-sided recordable/reproducible disc. The casing is formed with apertures or openings such as head insertion holes 11 and 21 through which a head of a recording/reproducing unit is inserted into the disc cartridge, drive shaft insertion holes 12 and 22 through which a drive shaft of the unit is inserted thereinto, and the like. The disc cartridge further includes a shutter 4 for selectively opening or closing the openings, which shutter is slidably arranged on a slide area 5 provided on an outer surface of the casing in a manner to be depressed from a level of the outer surface. The shutter 4 includes an upper plate 41, a lower plate 42, and a connection plate 43 through which the upper plate 41 and lower plate 42 are connected to each other and formed with a substantially U-shape in section. The shutter 4 has first and second sliders 6 and 7 for slidably guiding the shutter 4 and an elastic member or spring 8 for constantly urging or forcing the shutter 4 in a direction of closing the openings incorporated therein. In the illustrated embodiment, one such first slider 6 is arranged to slide while being engaged with first guide sections or guide projections $9_1$ provided on the upper and lower casing members 1 and 2, and a pair of such second sliders 7 are forcedly held at opposite ends of the first slider 6 by means of the spring 8 so as to interpose the first slider 6 therebetween and arranged so as to slide while being engaged with second guide sections or guide grooves $9_2$ provided on the upper and lower casing members 1 and 2. The second sliders 7 are also arranged so as to be pressedly abutted against respective stoppers or projections provided on the casing along the opposite ends of the openings formed at a central portion of a front side of the casing, resulting in the shutter 4 in being operated to open both directions.

Figure 2:
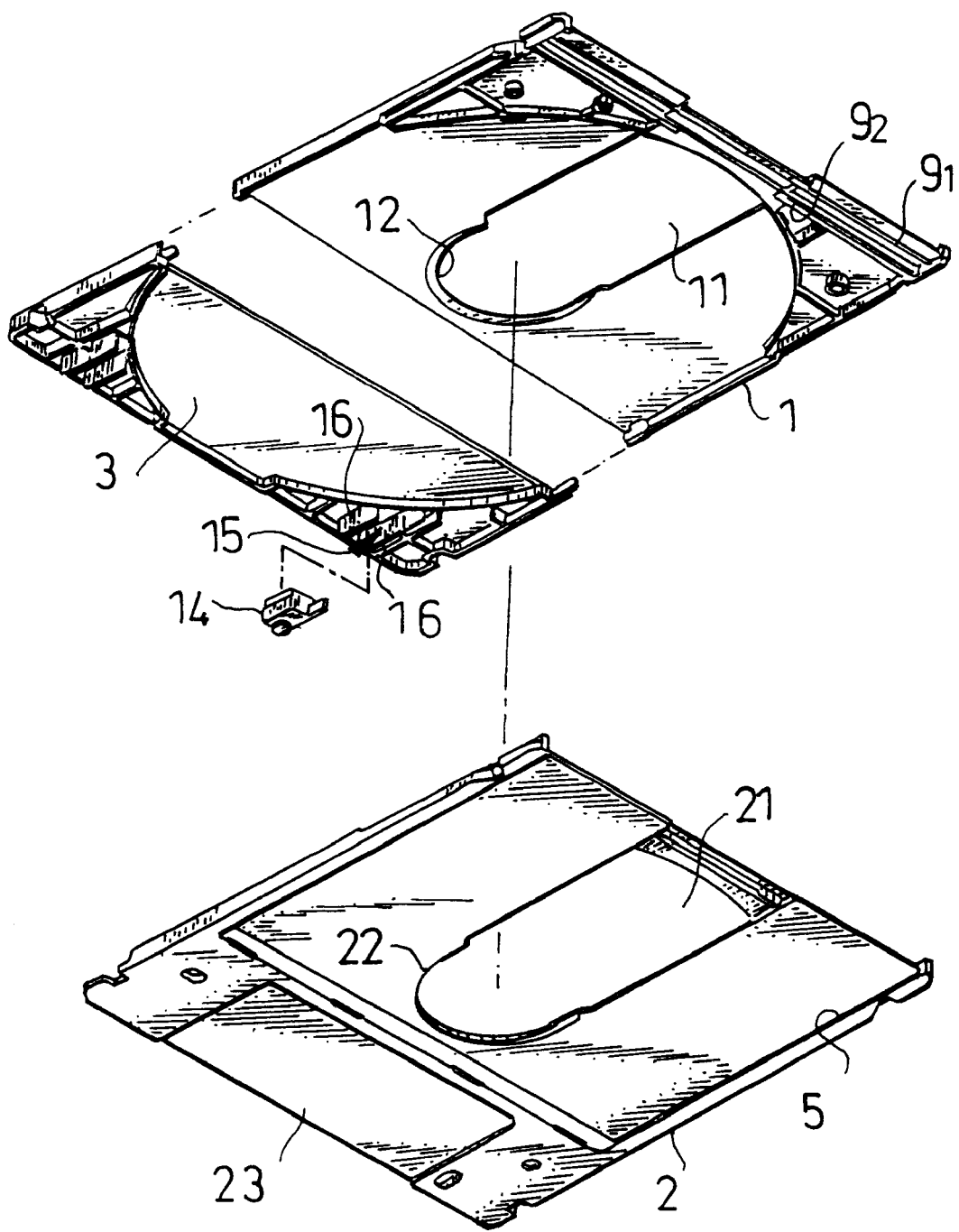
FIG. 2 is an exploded perspective view showing a casing for the disc cartridge shown in FIG. 1, viewed from a bottom side of the casing.
Figure 6:
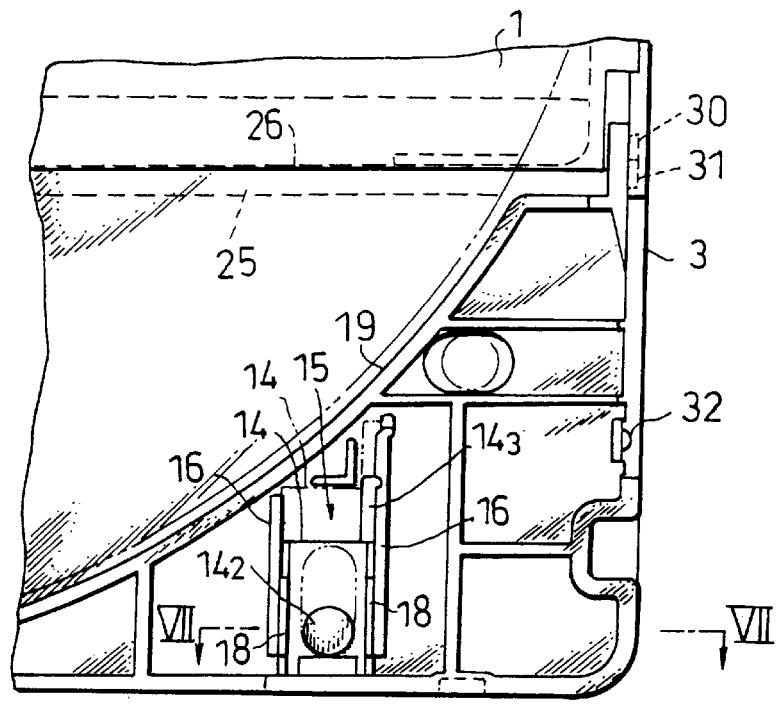
FIG. 6 is a fragmentary enlarged bottom view showing the upper casing member and a cover.

The casing is formed on a side surface thereof opposite from a side surface thereof on which the shutter 4 is arranged with a takeout opening 13 which permits the disc medium 10 to be taken out of the casing therethrough. The takeout opening 13 may be formed in any one of the upper and lower casing members 1 and 2 of the casing. In the illustrated embodiment, the opening 13 may be formed in the upper casing member 1. Also, the casing is provided thereon with a disc medium takeout cover 3 in a manner to be movable and more specifically both slidable and pivotable, to thereby open and close the takeout opening 13. The takeout cover 3, as shown in FIG. 2, is provided with a receiving section 15 in which an erasure prevention member 14 is received. The erasure prevention member 14 is slidably held in the receiving section 15, resulting in the disk medium 10 being selectively set in a "recordable" state or an "unrecordable" state.

Figure 7:
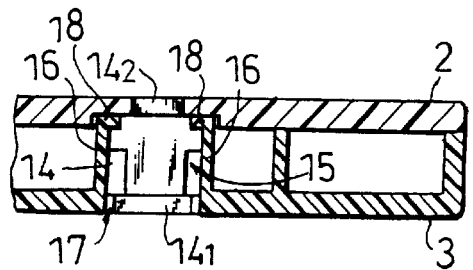
FIG. 7 is a vertical sectional view taken along line VII—VII of FIG. 6.
Figure 8:
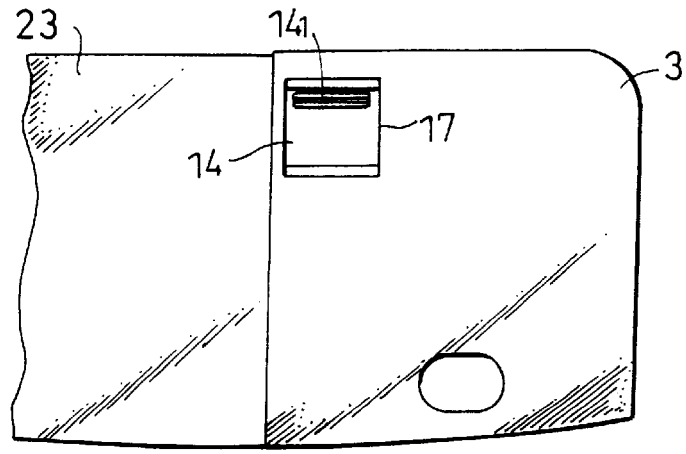
FIG. 8 is a fragmentary plan view showing the cover.

The erasure prevention member receiving section 15 is defined between guide walls 16 arranged on the cover 3 in a manner to be opposite to each other. The cover 3 is provided on a portion of a top wall thereof interposed between the guide walls 16 with an operation opening 17 as shown in FIGS. 7 and 8. The guide walls 16 are provided on a lower portion thereof with respective hook-like projections 18 in a manner to be opposite to each other so as to partially cover a lower surface of the erasure prevention member 14, to thereby prevent the erasure prevention member 14 from being removed or detached from the receiving section 15.

The erasure prevention member 14 is provided on a top surface thereof with an operation element $14_1$ and on a bottom surface thereof with a discrimination indication portion $14_2$ in a manner to be projected therefrom, to thereby facilitate both operation of the member 14 and discrimination of a direction or position thereof.

Figure 9A:
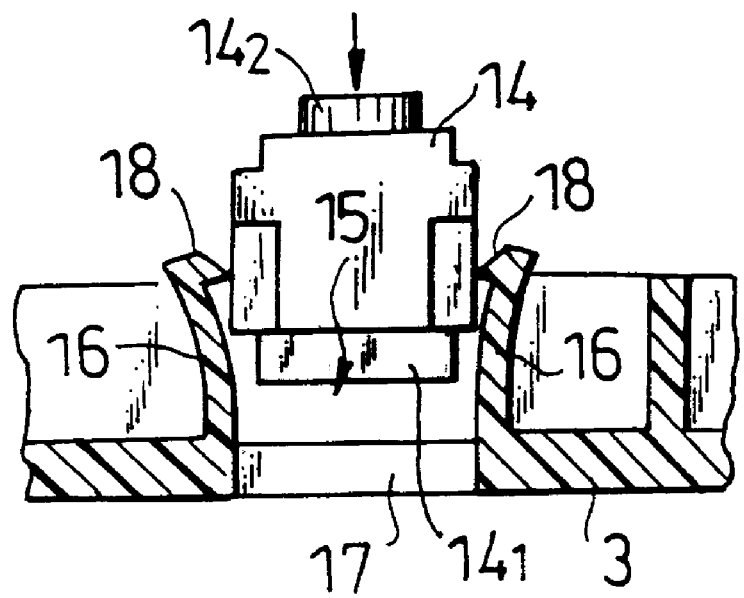
FIG. 9A is a fragmentary vertical sectional view showing an erasure prevention member during assembling thereof into the casing.
Figure 9B:
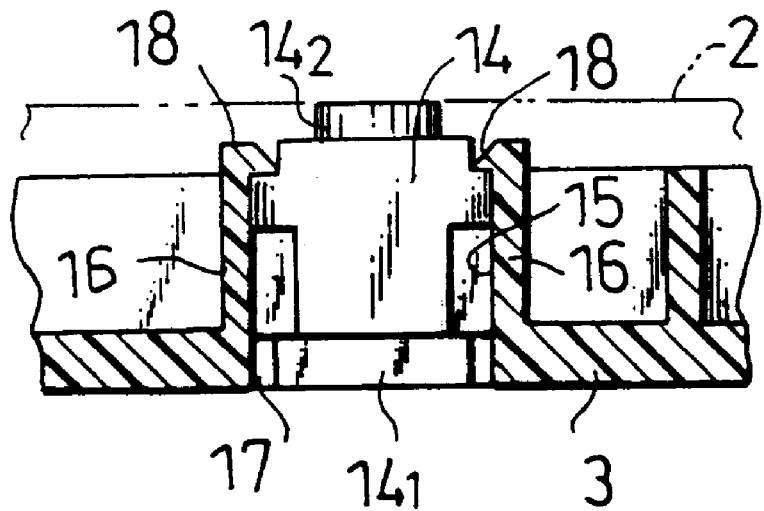
FIG. 9B is a fragmentary vertical sectional view showing the erasure prevention member after completion of assembling thereof into the casing.
Figure 10:
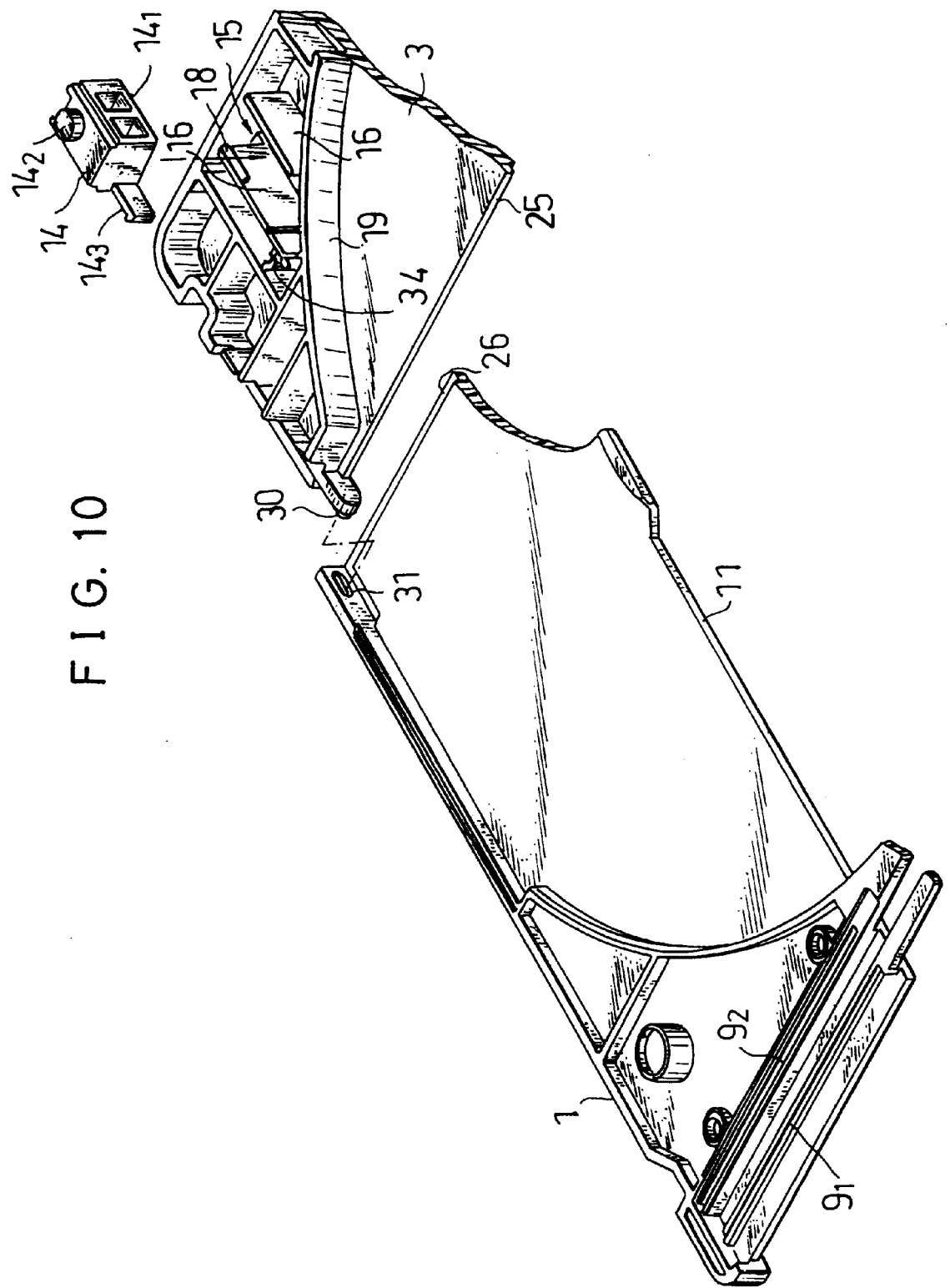
FIG. 10 is a fragmentary exploded perspective view showing an inside of an upper casing member of another embodiment of a disc cartridge according to the present invention.
Figure 11:
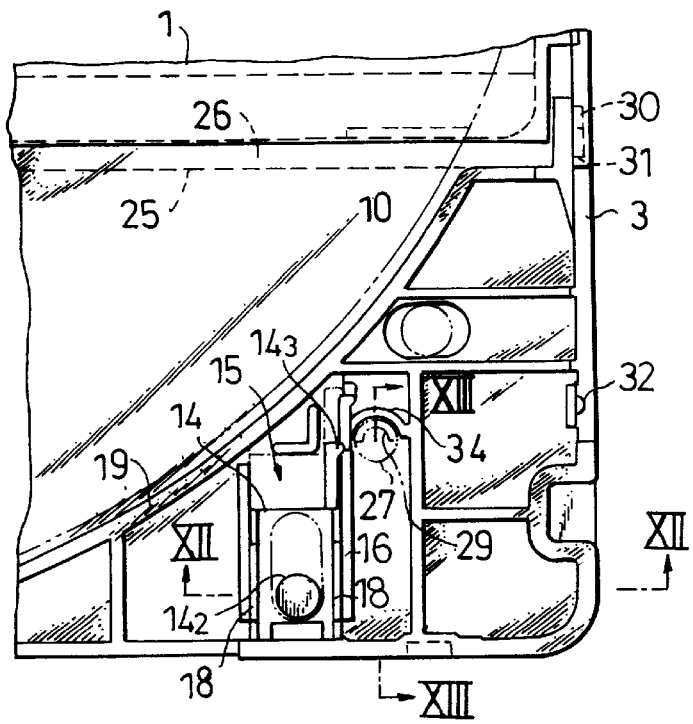
FIG. 11 is a fragmentary enlarged bottom view showing the upper casing member and a cover.
Figure 12:
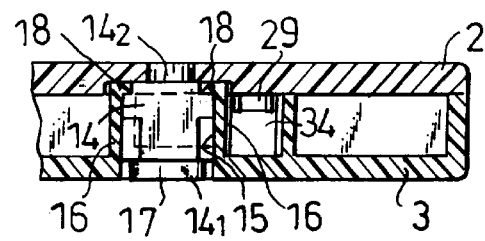
FIG. 12 is a vertical sectional view taken along line XII—XII of FIG. 11.
Figure 13:
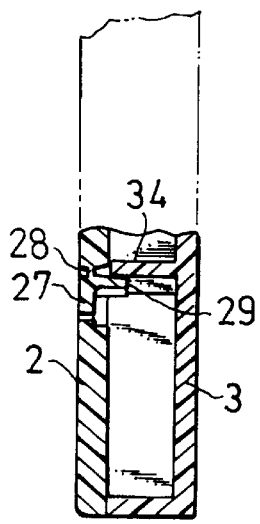
FIG. 13 is a vertical sectional view taken along line XIII—XIII of FIG. 11.
Figure 14:
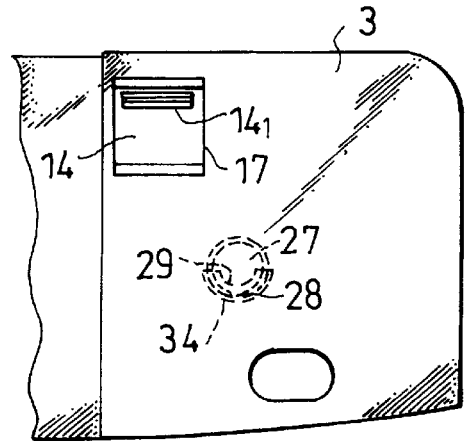
FIG. 14 is a fragmentary plan view showing the cover.

In the illustrated embodiment, the cover 3 is provided on opposite sides thereof with support shafts 30 and pivotally and slidably arranged through the support shafts 30 on a portion of one of the upper and lower casing members 1 and 2, for example, on a side of the upper casing member 1 opposite from the side surface of the casing on which the shutter 4 is arranged and in proximity to ends of the side. The erasure prevention member 14 for selectively setting the disc medium 10 in a "recordable" state or an "unrecordable" state is movably arranged in the cover 3. The hook-like projection 18 is provided on the lower portion of each of the guide walls 16 for guiding movement of the erasure prevention member 14, to thereby prevent the erasure prevention member 14 from being removed or detached from the cover 3 when the disc cartridge is both in a normal position and an inverted position or turned upside down while the cover 3 is opened. In the illustrated embodiment, the hook-like projections 18 each have a bottom surface inclined and the guide walls 16 are kept from being connected to both an outer peripheral wall of the cover 3 and an arcuate wall 19 for guiding an outer periphery of the disc medium 10, so that the guide walls 16 may be readily elastically deformable in an outward direction when the erasure prevention member 14 is incorporated into the receiving section 15 of the cover 3 as shown in FIGS. 9A and 9B.

The support shafts 30 of the cover 3 are supported or slidably and pivotally fitted in respective guide grooves 31 formed on opposite sides of the upper casing member 1, resulting in ensuring both parallel displacement and pivotal movement of the cover 3. This permits the cover 3 to be opened while being separated from the other casing member or lower member 2. Opening of the cover 3 is carried out by first carrying out parallel displacement of the cover 3 in a direction remote away from the shutter 4. Then, the cover 3 is pivotally moved to open the takeout opening 13. In the illustrated embodiment, an inner face of the lower casing member 2 opposite to the upper casing member 1 on which the cover 3 is arranged is formed so as to have a flat surface free from any projection, to thereby prevent the disc medium 10 from being caught by the lower casing member 2 during withdrawal or takeout thereof from the casing through the takeout opening 13 opened. Holding of the cover 3 during closing thereof is accomplished by engagement between projections 32 provided on the opposite sides of the cover 3 and recesses formed at the lower casing member 2, to thereby prevent accidental opening of the cover 3. The holding may be carried out either lightly so as to ensure ready opening of the cover 3 or firmly so as to ensure opening thereof with difficulty by forcedly pressing both sides of the cover 3 to elastically deform it, depending on applications thereof.

In the illustrated embodiment, the support shafts 30 are each formed at a distal end thereof with a cylindrical shape and partially cut out so as to have a flat surface formed on a part of an outer peripheral surface thereof and the guide grooves 31 are each formed with a shape which permits a respective one of the support shafts 30 to slide while the cut-out flat surface portion of the support shaft 30 is guided along a side surface of the guide groove 31. The guide grooves 31 are each formed at one end thereof with a circular hole $31_1$ in which a corresponding one of the support shafts 30 of the cover 3 is rotatably fitted, resulting in the cover 3 being pivotable. Such displacement and pivotal movement of the cover 3 permit the disc medium 10 to be selectively taken out from the casing as desired. Opening of the cover 3 may be carried out in any other suitable manner such as rotation thereof about an end of the upper casing member 1, mere sliding thereof or the like.

The shutter 4 is fixed on the first slider 6. For example, the shutter 4 may be slid between a closing position at which the openings of the casing are closed and an opening position at which the openings are opened while being guided by the guide projections $9_1$ and guide grooves $9_2$ of an inner surface of the casing. The shutter 4 may be made of polyacetal resin by injection molding and formed with a substantially U-shape in section.

In FIGS. 1 to 9B, reference numeral $14_3$ designates an elastic arm, 23 is a label 25 area, 24 is a shutter holder, and 25 and 26 are stepped fit surfaces formed at respective edge portions of the cover 3 and the upper casing member 1 which are abutted against each other, to thereby prevent dust from entering the casing during storage of the disk cartridge.

As described above, the disc cartridge of the illustrated embodiment is so constructed that the casing is formed on the side surface thereof opposite from the shutter 4 with the takeout opening 13 which permits the disc medium 10 to be taken out of the casing therethrough; the cover 3 is slidably and pivotally arranged on the casing for opening and closing the takeout opening 13 in such a manner that one of the upper and lower casing members 1 and 2 is provided with the guide grooves 31 in which the respective support shafts 30 of the cover 3 are slidably and pivotally fitted, to thereby permit the cover 3 to be selectively opened while being separated from the other of the upper and lower casing members 1 and 2; the cover 3 is provided with the receiving section 15; and the erasure prevention member 14 is slidably held in the receiving section 15 of the cover 3. Such construction permits takeout and insertion of the disc medium 10 with respect to the casing to be readily and safely carried out and ensures operation of the cover 3 with increased reliability. Also, such construction permits the disc medium 10 to be selectively and repeatedly set in an erasure prevention state or a recordable state and prevents removal of the erasure prevention member 14 from the casing during the opening or closing operation of the cover 3. Further, such construction facilitates takeout and insertion of the disc medium 10 with respect to the casing while ensuring increased reliability in operation of the disc cartridge.

Figure 15:
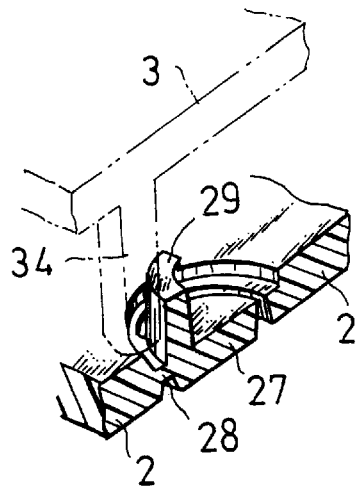
FIG. 15 is a fragmentary perspective view in section showing a discrimination member incorporated in the casing.
Figure 16A:
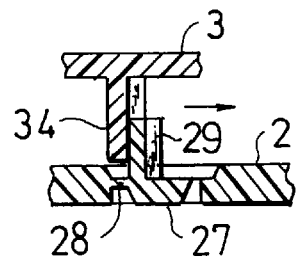
FIG. 16A is a fragmentary vertical sectional view showing the discrimination member right before movement of the cover.
Figure 16B:
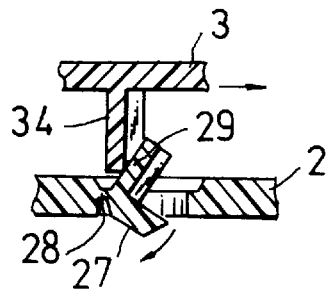
FIG. 16B is a fragmentary vertical sectional view showing the discrimination member during movement of the cover.
Figure 16C:
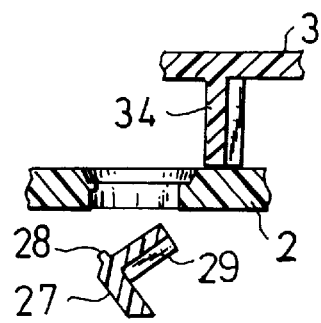
FIG. 16C is a fragmentary vertical sectional view showing the discrimination member after opening of the cover.

Referring now to FIGS. 10 to 16C, another embodiment of a disc cartridge according to the present invention is illustrated. A disc cartridge of the illustrated embodiment is so constructed that a cover 3 slidably and pivotally mounted on an upper casing member 1 is provided thereon with a release projection 34 and a lower casing member 2, as shown in FIGS. 11 to 15, is removably or detachably mounted thereon with a discrimination member 27 so as to be abutted against the projection 34 as shown in FIGS. 15 to 16C. More particularly, the discrimination member 27 is adapted to detect whether the cover 3 has been opened in the past, or to indicate that takeout of a disc medium 10 has not been carried out, and is arranged on a portion of the lower casing member 2 opposite to the cover 3. The discrimination member 27 is provided on an inside thereof with a projection 29 and includes a connection 28 through which the discrimination member 27 is connected at a part thereof to the lower casing member 2, resulting in the discrimination member 27 being removed from the lower casing member 2 at the connection 28. For this purpose, the connection 28 is preferably formed to have a reduced thickness to facilitate removal or separation of the discrimination member 27 from the lower casing member 2. The discrimination member 27 thus constructed may be provided on the lower casing member 2 by integrally forming the discrimination member 27 on the lower casing member 2 in such a manner that a ring-like slit is provided between the discrimination member 27 and the lower casing member 2 while leaving the thin-wall connection 28 therebetween. Thus, the discrimination member 27 may be connected to the lower casing member 2 through only the thin-wall connection 28. The projection 29 of the discrimination member 27 which is adapted to be abutted against the release projection 34 is arranged in proximity to the thin-wall connection 28, to thereby ensure that the discrimination member 27 is positively discharged outwardly of the casing when it is removed or separated therefrom due to abutment of the release projection 34 against the discrimination member 27 and more particularly the projection 29 of the member 27, which abutment is caused during the sliding movement of the cover 3, as shown in FIGS. 16A to 16C.

The release projection 34 is arranged on a portion of the inner surface of the cover 3 opposite to the discrimination member 27 and shaped in the form of a rib having a pillar-like shape which is, for example, arcuate in section. Also, the release projection 34 is arranged so as to be positioned in proximity to the projection 29 of the discrimination member 27 of the lower casing member 2 when the cover 3 is kept closed. Further, the release projection 34 may be arranged so as to be connected to an outer surface of one of guide walls 16 formed on the cover 3 so as to define a receiving section 15 for receiving an erasure prevention member 14 therein. Such arrangement of the release projection 34 facilitates detection of the discrimination member by the release projection 34.

The remaining part of this embodiment may be constructed in substantially the same manner as the first embodiment described above.

For opening of the cover 3, it is required to move or slide the cover 3 in a direction remote away from the shutter 4. This may be realized by forming each of the guide grooves 31 of the upper casing member 1 to have a width increased at a rear end thereof, for example, in the shape of a circular hole $31_1$ and forming each of the support shafts 30 of the cover 3 into a partially cut-out cylindrical shape, as shown in FIG. 5. Such formation of the guide grooves 31 and support shafts 30, when the cover 3 is to be opened, permits the cover 3 to be initially moved or slid in the rearward direction. Then, the cover 3 is permitted to be pivotally moved after the support shafts 30 reach the respective rear circular holes $31_1$ of the guide grooves 31.

At the time of the first opening operation of the cover 3 to take out the disc medium 10 from the casing, the pillar-like release projection 34 forcedly presses the projection 29 of the discrimination member 27 of the lower casing member 2 during sliding movement of the cover 3. Such an action of the release projection 34 permits the discrimination member 27 to be bent about the connection 28 and finally removed from the lower casing member 2, followed by outward discharge of the discrimination member 27 from the casing. Thus, when a user is to merely carry out takeout of the disc-like medium 10, the discrimination member 27 is automatically operated without any specific operation thereof, to thereby eliminate a failure to change the state of the discrimination member 27.

Thus, the above-described construction of the illustrated embodiment permits a user to carry out takeout of the disc medium 10 without a necessity of operating the discrimination member 27, to thereby eliminate wrong use of the discrimination member.

In addition, the disc cartridge of the illustrated embodiment may be so constructed that the upper and lower casing members 1 and 2 are formed with substantially the same outer configuration. Furthermore, as the support shafts 30 and the guide grooves 31 are correlative to each other, they may be transposed without a change in function.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A disc cartridge comprising:

a casing including an upper casing member and a lower casing member joined to each other and formed with openings through which a recording/reproducing head and a drive shaft are inserted into said casing;

a disc medium rotatably received in said casing;

a shutter arranged on said casing for opening and closing said openings;

said casing being formed on a side surface thereof opposite from said shutter with a takeout opening which permits said disc medium to be taken out of said casing therethrough;

a cover slidably and pivotally arranged on one of said upper and lower casing members to open and close said takeout opening;

a pair of guides arranged on opposite sides of one of said upper and lower casing members for slidably and pivotally moving said cover;

a pair of engagement members comprising support shafts provided on opposite sides of said cover and arranged on opposite sides of said cover and engaged with said pair of guides, to thereby be guided by said pair of guides so that said cover is linearly movable in parallel to said opposite sides of said one casing member and said cover is pivotally movable about said engagement members;

said pair of guides comprising guide grooves provided on one of said upper and lower casing members for slidably and pivotally fitting therein said support shafts of said cover, respectively, to thereby permit said cover to be selectively opened while being separated from the other of said upper and lower casing members and said guide grooves each being formed at one end thereof with a circular hole;

said support shafts of said cover each being formed with a partially cut-out cylindrical shape, to thereby have a flat surface partially formed on a periphery thereof and each being fitted in a respective one of said guide grooves for sliding while said flat surface of said shaft is guided along a side surface of said guide groove; and said support shafts each being pivotally moved in said circular hole of a respective one of said guide grooves, resulting in said cover being selectively opened as desired.

2. A disc cartridge as defined in claim 1, wherein said cover is provided with a receiving section for receiving an erasure prevention member; and said erasure prevention member is slidably held in said receiving section of said cover.

3. A disc cartridge as defined in claim 2, wherein said receiving section of said cover is defined by guide walls arranged on said cover in a manner to be opposite to each other.

4. A disc cartridge as defined in claim 3, wherein said erasure prevention member is provided on upper and bottom surfaces thereof with an operation element and a discrimination indication portion in a manner to be projected therefrom, respectively.

5. A disc cartridge as defined in claim 4, wherein said cover is provided at a portion of a top wall thereof defined between said guide walls with an operation hole corresponding to said operation element.

6. A disc cartridge as defined in claim 3, further comprising a discrimination member, removably provided on said casing, for indicating that takeout of said disc medium has not been carried out; and a release projection provided on said cover so as to be abutted against said discrimination member.

7. A disc cartridge as defined in claim 6, wherein said release projection is shaped in the form of an arcuate rib and connected to an outer surface of one of said guide walls formed on said cover for defining said receiving section.

8. A disc cartridge as defined in claim 2, wherein said erasure prevention member is provided on upper and bottom surfaces thereof with an operation element and a discrimination indication portion in a manner to be projected therefrom, respectively.

9. A disc cartridge as defined in claim 2, wherein said upper and lower casing members are formed with substantially the same outer configuration; and the other casing member opposite to said one casing member on which said cover is arranged is formed at a portion of an inner surface thereof opposite to said cover with a flat shape.

10. A disc cartridge as defined in claim 2, wherein said cover and said one casing member are formed at respective edge portions thereof abutted against each other with stepped fit surfaces.

11. A disc cartridge as defined in claim 2, wherein said shutter includes a slider structure for slidably guiding said shutter and an elastic member for urging said shutter in a direction of closing said openings.

12. A disc cartridge as defined in claim 1, further comprising a discrimination member, removably provided on said casing for indicating that takeout of said disc medium has not been carried out; and a release projection provided on said cover so as to be abutted against said discrimination member.

13. A disc cartridge as defined in claim 12, wherein said upper and lower casing members are formed with substantially the same outer configuration; and the other casing member opposite to said one casing member on which said cover is arranged is formed at a portion of an inner surface thereof opposite to said cover with a flat shape.

14. A disc cartridge as defined in claim 12, wherein said cover and said one casing member are formed at respective edge portions thereof abutted against each other with stepped fit surfaces.

15. A disc cartridge as defined in claim 12, wherein said shutter includes a slider structure for slidably guiding said shutter and an elastic member for urging said shutter in a direction of closing said openings.

16. A disc cartridge as defined in claim 1, wherein said upper and lower casing members are formed with substantially the same outer configuration; and the other casing member opposite to said one casing member on which said cover is arranged is formed at a portion of an inner surface thereof opposite to said cover with a flat shape.

17. A disc cartridge as defined in claim 1, wherein said cover and said one casing member are formed at respective edge portions thereof abutted against each other with stepped fit surfaces.

18. A disc cartridge as defined in claim 1, wherein said shutter includes a slider structure for slidably guiding said shutter and an elastic member for urging said shutter in a direction of closing said openings.

* * * * *